G. E. BISHOP.
FASTENER.
APPLICATION FILED JAN. 7, 1915.
1,190,852. Patented July 11, 1916.
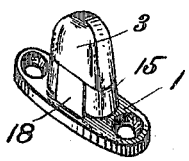
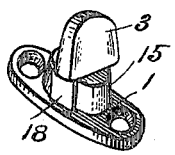
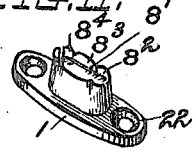
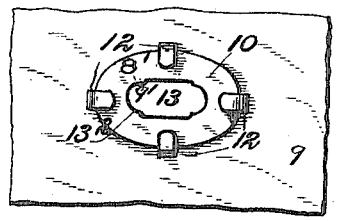
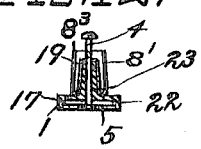
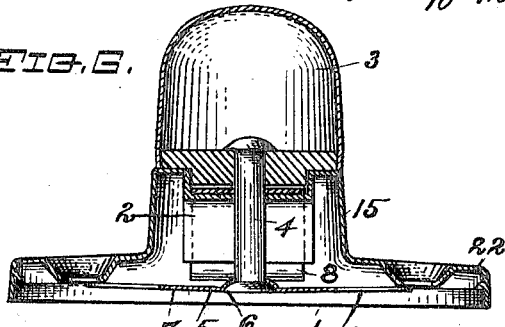
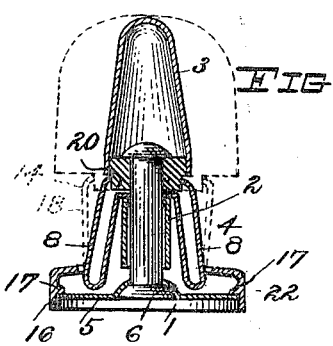
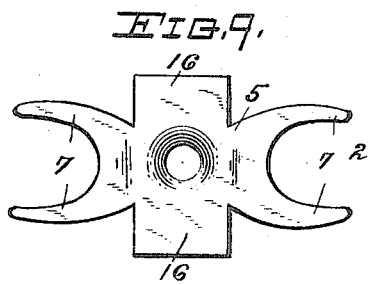
Witnesses:
A. C. Turner
G. A. Knerr
Inventor:
George E. Bishop
By George W. Saywell
Attorney

UNITED STATES PATENT OFFICE.

GEORGE E. BISHOP, OF CLEVELAND, OHIO.

FASTENER.

1,190,852. Specification of Letters Patent. Patented July 11, 1916.

Application filed January 7, 1915. Serial No. 902.

*To all whom it may concern:*

Be it known that I, GEORGE E. BISHOP, a citizen of the United States, resident of Cleveland, county of Cuyahoga, and State of Ohio, have invented new and useful Improvements in Fasteners, of which the following is a specification, the principle of the invention being herein explained and the best mode in which I have contemplated applying that principle, so as to distinguish it from other inventions.

My invention relates to fasteners and particularly to fasteners which are so constructed so as to be locked securely within their respective eyelets so as not to be movable therein when thus locked and consequently not be noisy or rattle.

More particularly, further, my invention relates to such fasteners for use upon automobile curtains, especially such fasteners as are locked within the eyelets secured within the curtain fabric, by means of rigidly securing a flexible member of the fastener to the inner wall of said eyelets.

The annexed drawing and the following description illustrate means which show the principle of my invention, such means being but one of the various ways in which the spirit of my invention may be utilized.

In said annexed drawing: Figure 1 represents a perspective view of one form of construction illustrating the general principle of my improved fastener, showing the respective parts of the same when in their unlocked positions. Fig. 2 represents a perspective view of the parts shown in Fig. 1, when the same are in their locked positions, plainly showing this position of the locking spring. Fig. 3 represents an elevation of a section of fabric in which is secured an eyelet in which the button (not shown) of the construction shown in Fig. 1 is secured and to the inner straight-edge walls of which it is locked. Fig. 4 is a central vertical section of the parts shown in Fig. 3. Fig. 5 is a plan view of a metallic ring forming part of the fastener eyelet shown in Fig. 3, and plainly showing the straight-edge inner walls to which the fastener can be securely locked. Fig. 6 is an enlarged vertical section of the fastener. Fig. 7 is a vertical section taken at right angles to the section shown in Fig. 6, and on the same scale, and showing in dotted lines the position assumed by the head of the fastener and the locking spring when the fastener is locked. Fig. 8 is an enlarged perspective view of the locking spring. Fig. 9 is an enlarged plan view of a take-up spring. Fig. 10 is an enlarged bottom plan view of the fastener head. Figs. 11 and 12 represent perspective and transverse vertical sectional views, respectively, of the lower part of a modified form of fastener forming the most approved type of construction embodying my invention. Fig. 13 is a bottom plan view of my improved fastener.

Referring particularly to Figs. 1 to 10, inclusive, and Fig. 13, of the annexed drawing, the frame of my improved fastener is shown at 1, having a strengthening and supporting member 2. The head of the fastener is shown at 3 and is a turning member adapted (as will be hereinafter fully described) to lock the fastener rigidly within the fabric eyelet $9^1$. A pin 4 securely connects a take-up spring 5, positioned underneath the frame 1 and comprising a rigid center portion 6 and flexible end portions 7, with the turning head 3, as plainly shown in Figs. 6 and 7. The ends 16 of rigid center portion 6 of spring 5 are disposed beneath the shoulders 17 of the base portion 22 of frame 1, as plainly shown in Fig. 7. A spring member adapted by the turning of head 3 to be so actuated as to lock securely the fastener within the eyelet $9^1$ (hereinafter fully described) and to the inner walls of such eyelet, is shown at 8, such spring member comprising a double-acting spring with exterior members 18 provided with the curved ends $18^1$ Fig. 8, and interior members 19. A section of curtain fabric is shown at 9 so cut as to receive the fastener eyelet $9^1$ comprising the ring members 10 and 11, the latter of which by means of the clenched prongs 12 firmly secures said ring members 10 and 11 to the fabric 9. Ring member 10 is provided with oppositely disposed straight-edge inner walls 13 so formed as to provide the shoulders $13^1$ intermediately of the straight-edge sides 13 and the rounded ends $13^2$ (as shown in Figs. 3 and 5). The turning and locking head 3 is provided with a rectangularly shaped base portion 14 of dimensions appreciably longer in one direction than in the transverse direction, as plainly shown in Fig. 10. The shank portion 15 of the frame 1, the spring 8, and pin 4 may be of such lengths as to accommodate a plurality of eyelets so as securely to fasten a plurality of curtains by means of one fastener, the first curtain being held by the action of the double-acting spring itself and the other curtains by the stress of spring members 18 actuated by head 3.

It will be plainly evident from the foregoing description and annexed drawing that the turning of head 3, as shown in Fig. 2, and in dotted lines in Fig. 7, will spring the side members 18 of the double-acting spring member 8, by means of the short sides 20 of the base portion 14 of the head 3, into the positions shown in said Fig. 2 and in dotted lines in Fig. 7, which positions of said spring sides 18 will cause them intimately to contact the straight-edge inner walls 13 of the ring member 10, between the shoulders 13¹, thus securely locking the fastener and preventing any and all agitation of the same. The take-up spring 5 is adapted to compensate for any wear between the turning head 3 and the double-acting spring 8.

In the most approved form of fastener shown in Figs. 11 and 12, the frame 1 is entirely dispensed with except the base portion 22. A stud 23 is provided, either integral with the base portion 22 or a separate element, as a strengthening and supporting member upon which the spring 8, in this form provided with the curved sides 8¹ is mounted, the pin 4, connecting the parts as shown. Curved sides 8¹ of the double-acting spring 8 are of such a length as to provide an approximately continuous outer surface and are bent so that each side 8¹ comprises the three portions 8² 8³ and 8⁴, as shown in Fig. 11, whereby any undesired turning of head 3 is prevented. It will be readily understood that the form of spring 8, shown in Figs. 11 and 12 would operate in an oval shaped eyelet instead of the form of eyelet shown in Figs. 3 and 5.

Having thus shown and described my invention, what I claim and desire to secure by Letters Patent is:

1. In an improved fastener, the combination with a frame and a turning head: of a spring member provided with an approximately continuous outer surface and adapted by the turning of said head rigidly to engage a fastener eyelet.

2. In an improved fastener, the combination of a frame; a spring member supported thereon; a turning member also supported upon said frame and adapted to actuate said spring member rigidly to engage a fastener eyelet; and means adapted to take up wear between said spring member and said actuating means.

3. In an improved fastener, the combination of a frame and a turning head therefor; means adapted by the turning of said head to hold said fastener rigidly against the wall of an eyelet; and means adapted to take up wear between said turning head and said holding means.

4. In an improved fastener, the combination of a frame; a spring member supported thereon; means adapted to actuate said spring member rigidly to engage a fastener eyelet; and a second spring member adapted to take up wear between said first spring member and said actuating means.

5. In an improved fastener, the combination of a frame; a spring member supported thereon and provided with an approximately continuous outer surface; and a turning head provided with a rectangularly shaped base adapted to engage said spring member with its sides of one dimension to unlock the fastener and its sides of the other dimension to lock the same.

6. In an improved fastener, the combination of a frame; a spring member supported thereon and provided with an approximately continuous outer surface; and a turning head provided with a rectangularly shaped base adapted to engage said spring member with its long sides to unlock the fastener and with its short sides to lock the same.

7. In an improved fastener, the combination of a base-member; a turning-member; and a spring member disposed intermediately of said base-member and said turning-member and adapted by the action of said latter member rigidly to engage a fastener eyelet.

8. In an improved fastener, the combination of a base-member; a turning-member; and a spring member disposed intermediately of said base-member and said turning-member, of approximately continuous outer surface, and adapted by the action of said turning member rigidly to engage a fastener eyelet.

9. In an improved fastener, the combination of a base member provided with a stud; a turning member rotatable upon said stud; and a spring member carried upon said stud and adapted by the action of said turning member rigidly to engage a fastener eyelet.

10. In an improved fastener, the combination of a base-member; a stud secured thereto; a turning-member; a spring-member carried upon said stud and adapted by the action of said turning-member rigidly to engage a fastener eyelet; and means adapted to take up wear between said turning-member and said spring-member.

11. In an improved fastener, an element comprising a double-acting spring consisting of a center transverse section and longitudinal end sections bent double, respectively, into interior and exterior members, the exterior members being formed to reach beyond the plane of the central transverse section of the element.

12. In an improved fastener, an element comprising a double-acting spring consisting of a center transverse section and longitudinal end sections bent double, respectively, into interior and exterior members, said exterior members being provided with curved ends, respectively.

In testimony whereof, I have signed this specification on this 24th day of December, 1914.

GEORGE E. BISHOP.

Witnesses:
G. E. MOSHER,
WM. C. RHODES.

Copies of this patent may be obtained for five cents each, by addressing the "Commissioner of Patents, Washington, D. C."